O. O. BALLARD AND J. C. STEDMAN.
FENDER ATTACHMENT.
APPLICATION FILED MAY 15, 1920.
1,415,295.
Patented May 9, 1922.
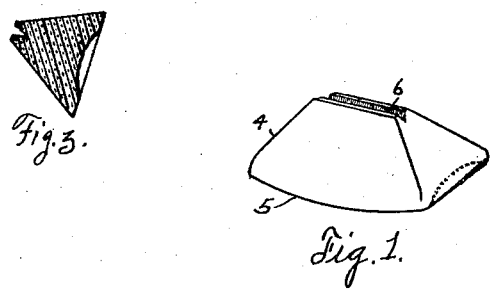
Fig. 3.
Fig. 1.
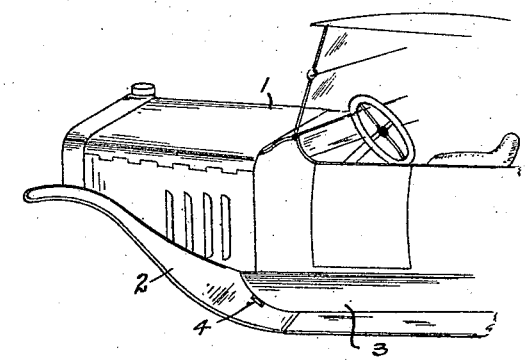
Fig. 2.
INVENTORS
Orlo O. Ballard
Jacob C. Stedman
BY
Hardway & Cathey
ATTORNEYS

UNITED STATES PATENT OFFICE.

ORLO O. BALLARD AND JACOB C. STEDMAN, OF HOUSTON, TEXAS.

FENDER ATTACHMENT.

1,415,295.  Specification of Letters Patent.  Patented May 9, 1922.

Application filed May 15, 1920. Serial No. 381,771.

*To all whom it may concern:*

Be it known that we, ORLO O. BALLARD and JACOB C. STEDMAN, citizens of the United States, residing at Houston, in the county of Harris and State of Texas, have invented certain new and useful Improvements in a Fender Attachment, of which the following is a specification.

This invention relates to new and useful improvements in a fender attachment.

One object of the invention is to provide an antirattling attachment for automobile fenders which is particularly adapted for use on the front fenders of Ford automobiles. Another object of the invention is to provide an attachment of the character described which, when applied, will prevent the fender from rattling, which is of simple construction and may be cheaply and easily manufactured and readily applied.

With the above and other objects in view the invention has particular relation to certain novel features of construction, and use, an example of which is given in this specification and illustrated in the accompanying drawings wherein:

Figure 1 is a perspective view of the attachment and,

Figure 2 shows a fragmentary side view of an automobile with the attachment applied.

Figure 3 shows a section through the attachment.

Referring now more particularly to the drawings wherein like numerals of reference designate similar parts in each of the figures, the numeral 1 refers to a motor vehicle, the numeral 2 refers to the fender thereof, the numeral 3 designates the side plate of the automobile which lies adjacent said fender. The numeral 4 designates a block of rubber or similar material which has a comparatively wide base 5 and which has the longitudinal groove 6 in the apex thereof. When applying the device that portion of the fender adjacent the plate 3 is forced downwardly by means of a screw driver or other similar implement and the block 4 is then inserted between the fender and plate, the wide base 5 resting on the fender and the groove 6 receiving the adjacent edge of the plate 3. When the fender is released its flexibility will force the block 4 up against the plate 3 and hold it securely in place and the fender will thereby be held against rattling, the attachment acting as a cushion for that purpose. The concave underside acts as a vacuum to assist in holding the attachment in position.

What we claim is:

1. An attachment of the character described adapted to be inserted between the automobile fender and the adjacent side plate, and consisting of a cushioning block having a lengthwise groove in one side thereof to receive said plate and having a concave portion on its other side to rest on said fender.

2. In an attachment of the character described consisting of a cushioning block made of resilient material having a comparatively wide base, and an opposite apex said base being concaved and the apex having a lengthwise groove.

In testimony whereof we have signed our names to this specification in the presence of two subscribing witnesses.

ORLO O. BALLARD.
JACOB C. STEDMAN.

Witnesses:
JAS. W. OLIVER,
WM. A. CATHEY.